US011978416B2

(12) United States Patent
L'Episcopo et al.

(10) Patent No.: US 11,978,416 B2
(45) Date of Patent: May 7, 2024

(54) HIGH EFFICIENCY GHOST ILLUMINATION CANCELATION IN EMISSIVE AND NON-EMISSIVE DISPLAY PANELS

(71) Applicant: STMicroelectronics S.r.l., Agrate Brianza (IT)

(72) Inventors: Gaetano L'Episcopo, Catania (IT); Giovanni Conti, Acireale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/991,152

(22) Filed: Nov. 21, 2022

(65) Prior Publication Data

US 2023/0222987 A1 Jul. 13, 2023

Related U.S. Application Data

(63) Continuation of application No. 17/570,788, filed on Jan. 7, 2022, now Pat. No. 11,538,427.

(51) Int. Cl.
*G09G 3/36* (2006.01)
*G09G 3/32* (2016.01)

(52) U.S. Cl.
CPC ............ *G09G 3/3611* (2013.01); *G09G 3/32* (2013.01); *G09G 2300/0842* (2013.01); *G09G 2320/0257* (2013.01)

(58) Field of Classification Search
CPC .................. G09G 3/3611; G09G 3/32; G09G 2300/0842; G09G 2320/0257
See application file for complete search history.

(56) References Cited

U.S. PATENT DOCUMENTS 9,087,486 B2 * 7/2015 Gandhi ................ G02B 26/001
9,818,338 B2 * 11/2017 Ruan ........................ G09G 3/32
(Continued)

FOREIGN PATENT DOCUMENTS

CN 104091568 B 5/2016
CN 110831300 A 2/2020
CN 110120201 B 7/2020

OTHER PUBLICATIONS

Chung, Kai-Cheng, et al.: "A Dynamic Compensated and 95% High-Efficiency Supply Buffer in RGB Virtual Pixel MicroLED Display for Reducing Ghosting by 73% and Achieving Four Times Screen Resolution," IEEE Transactions on Power Electronics, vol. 36, No. 7, Jul. 2021, pp. 8291-8299.

*Primary Examiner* — Andrew Sasinowski
(74) *Attorney, Agent, or Firm* — Crowe & Dunlevy LLC

(57) ABSTRACT

Display elements, each having anode and cathode terminals, are arranged into rows and columns. Each row has an anode-line coupled to the anode terminals for its display elements. Each column has a cathode-line coupled to the cathode terminals for its display elements. A switch for each anode-line selectively couples that anode-line to a storage capacitor, and a switch for each cathode-line selectively couples that cathode-line to the storage capacitor. A display driver activates the row driver for a given row and the column driver for a given column. A switch driver closes the switch for the cathode-line for the given column, then opens the switch for that cathode-line. The display driver deactivates the row driver for the given row, after closing the switch for the cathode-line for the given column. The switch driver closes the switch for the anode-line for the given row.

15 Claims, 10 Drawing Sheets

(56) References Cited

U.S. PATENT DOCUMENTS

| | | | | |
|---|---|---|---|---|
| 2016/0104430 | A1* | 4/2016 | Park | G09G 3/3291 345/204 |
| 2016/0379571 | A1* | 12/2016 | Kim | G09G 3/3233 345/215 |
| 2017/0205874 | A1* | 7/2017 | Miyaguchi | G06F 3/0304 |
| 2018/0219025 | A1* | 8/2018 | Takahashi | G09G 3/3659 |
| 2020/0365076 | A1 | 11/2020 | Nadershahi | |
| 2021/0018795 | A1 | 1/2021 | Calayir et al. | |
| 2021/0280153 | A1 | 9/2021 | Chaji et al. | |

* cited by examiner

HIGH EFFICIENCY GHOST ILLUMINATION CANCELATION IN EMISSIVE AND NON-EMISSIVE DISPLAY PANELS

RELATED APPLICATION

This application is a continuation of United States Application for patent Ser. No. 17/570,788, filed Jan. 7, 2022, the content of which is hereby incorporated by reference in its entirety.

TECHNICAL FIELD

This disclosure is related to the field of display technology and, in particular, to techniques for cancelling ghost illuminations resulting from the charging and discharging of parasitic capacitances within both emissive and non-emissive display panels.

BACKGROUND

Many electronic devices, such as smartphones, smartglasses, smartwatches, tablets, laptops, monitors, and televisions utilize display panels for the purposes of displaying information to users. Such display panels are organized into a two-dimensional matrix of rows and columns, with the intersections between rows and columns representing display elements such as zones (in the case of non-emissive displays) and pixels (in the case of an emissive display). A sample type of non-emissive display is a liquid crystal display (LCD), commonly used in televisions for example, and a sample type of emissive display is an organic light emitting diode (OLED) display, commonly used in smartphones for example.

A sample LCD based non-emissive display panel 12 incorporated into a free-standing display 10 is shown in FIG. 1A. The non-emissive display panel 12 is formed by a two-dimensional matrix of display zones, with a sample display zone being indicated by reference numeral 15. Each display zone 15 contains multiple pixels, with each pixel containing at least one red sub-pixel, at least one green sub-pixel, and at least one blue sub-pixel.

The illustrated display zone 15 is representative of each of the display zones within the non-emissive display panel 12, and includes a liquid crystal LC 16*a* for modulating display of the color red, a liquid crystal LC 16*b* for modulating display of the color green, and a liquid crystal LC 16*c* for modulating display of the color blue. The liquid crystals 16*a*-16*c* are arranged over a backlight for that zone, which here is formed by one or more light emitting diodes (LEDs) 17 connected in series and/or parallel. A single zone 17 may illuminate one or more liquid crystals LC 16*a*, 16*b*, and 16*c*—for example, a single backlight zone 17 may illuminate one or more liquid crystals LC 16*a* for modulating display of the color red, one or more crystals LC 16*b* for modulating display of the color green, and one or more crystals LC 16*c* for modulating display of the color blue. Additionally or alternatively, a single zone 17 may illuminate one or more liquid crystals LC modulating colors other than red, green, and blue.

The specific layer structure forming the non-emissive display panel 12 can be seen in FIG. 1B, where it can be observed that a backlight backpane 13 carries backlight LEDs 17, with a color conversion and diffusion layer 19 being disposed over the backlight LEDs 17. The liquid crystals 16 are disposed over the color conversion and diffusion layer 19, and a display glass layer 18 is disposed over the liquid crystals 16. Note that the backlight backpane 13 and LEDs 17 can be collectively referred to as a matrix 14.

Images are produced by the LEDs 17 emitting light which is then converted by the color conversion and diffusion layer 19 into different beams of red, green, and blue light which in turn pass through the liquid crystals 16 and out of the display glass 18. A voltage across each individual liquid crystal 16 is modulated, causing those individual liquid crystals to change in transparency, thereby modulating the amount of light passing through those liquid crystals. Different colors are displayed by operation of the liquid crystals 16 modulating the intensity of the red, green, and blue light beams as they pass therethrough. Since the source of the light itself is the LEDs 17 with a given zone, and not the pixels within that given zone, the display panel 12 is considered to be non-emissive (e.g., have non-emissive pixels, and instead have emissive zones, with each zone providing light to multiple pixels).

A sample emissive display panel 22 incorporated into a free-standing display 20 is shown in FIG. 2A. The emissive display panel 22 is formed by a two-dimensional matrix of pixels, with a sample pixel being indicated by reference numeral 25. Each pixel, such as pixel 25, contains at least one red sub-pixel, at least one green sub-pixel, and at least one blue sub-pixel. For example, pixel 25 includes a sub-pixel having a light emitting diode (LED) 26*a* that generates blue light, a sub-pixel having an LED 26*b* that generates green light, and a sub-pixel having an LED 26*c* that generates red light. The LEDs 26*a*-26*c* may be organic light emitting diodes (OLEDs) or micro-LEDs, for example. Each pixel 25 may additionally or alternatively include one or more sub-pixels with LEDs that emit light having a color other than red, green, or blue.

The specific layer structure forming the emissive display panel 22 can be seen in FIG. 2B, where it can be observed that a panel backpane 23 carries the LEDs 26, with a display glass 28 disposed over the LEDs 26. One or more color conversion layers can be interposed between the panel backpane 23 and the display glass. The panel backpane 23 and LEDs 26 can collectively be referred to as matrix 24.

Images are produced by the LEDs 16 emitting light of different intensities. Each pixel contains at least one red LED 26*c*, at least one green LED 26*b*, and at least one blue LED 26*a*. Each pixel can display a desired color by modulation of the intensity of the light produced by its LEDs 26. Since the source of the light itself is the LEDs 26, which are also the source of the colors produced by a given pixel, the display panel 22 is considered to be emissive (e.g., have emissive pixels, with each pixel providing its own light).

An issue that arises with both non-emissive and emissive displays is that of "ghosting". Ghosting, generally speaking, may occur when after a given pixel or zone is illuminated and then switched off, it remains partially illuminated for a period of time, when leads to the display of "ghost" images. Ghosting may also occur when a given pixel or zone is illuminated prior to being switched on.

The causes of ghosting will now be described in greater detail with reference to FIG. 3. Shown in FIG. 3 is a schematic block diagram of the matrix 14 or 24 within a display panel 12 or 22. Pixels or zones are arranged into the two-dimensional matrix 14 or 24 having dimensions of M by N, with it being understood that the illustrated LED within each pixel or zone may represent any useful arrangement of one or more sub-pixel LEDs or backlight LEDs. In the illustrated arrangement, the anodes of each LED in a same row are coupled to a same anode-supply line, and the cathodes of each LED in a same column are coupled to a same cathode-supply line. Each cathode-supply line is coupled to a respective column driver CD1, . . . , CDM and each anode-supply line is selectively coupled to a voltage supply 9 by a respective switch Sw1, . . . , Swn. Each anode-supply line has a respective parasitic capacitance Cpr1, . . . , Cprn associated therewith, and each cathode-supply line has a respective parasitic capacitance Cpc1, . . . , Cpcm associated therewith. Each pixel or zone is individually activatable by closing the switch Sw1, . . . , Swn of its respective anode-supply line and activating the column driver CD1, . . . , CDm of its respective cathode-supply line.

Due to the repeated closing and opening of the switches Sw1, . . . , Swn, the parasitic capacitances Cpr1, . . . , Cprn and Cpc1, . . . , Cpcm may be charged and discharged, ultimately resulting in ghosting. Two types of ghosting may occur.

"Upper ghosting" may occur when one of the switches Sw1, . . . , Swn of an anode-supply line is closed and a column driver CD1, . . . , CDm is activated, charging its associated parasitic capacitance Cpr1, . . . , Cprn, and then that switch is opened while the column driver is still activated. This discharges the parasitic capacitance through the associated pixel or zone, and then through the associated column driver to ground, in the process causing the emission of light by the LEDs within that pixel or zone.

A sample current path for upper ghosting may be observed in FIG. 3, illustrated in light colored arrows. In particular, the discharge of the parasitic capacitance Cpr1, through the pixel/zone [1,1], through the column driver CD1 to ground may be observed. "Lower ghosting" may occur when one of the switches Sw1, . . . , Swn of an anode-supply line is closed and a column driver CD1, . . . , CDm is activated, charging its associated parasitic capacitance Cpr1, . . . , Cprn, and then that switch is opened while the column driver is deactivated. The result is that the parasitic capacitance Cpr1, . . . , Cprn is discharged through the associated pixel or zone to the associated parasitic capacitance Cpc1, . . . , Cpcm for cathode-supply line associated with the previously activated column driver CD1, . . . , CDm, in the process causing emission of light by the LEDs within that pixel or zone. The column parasitic capacitance Cpr1, . . . , Cprm may also be directly charged by the voltage supply 9 immediately after the slowing of the switch Sw1, . . . , Swn, even if the row parasitic capacitance Cpr1, . . . , Cprn is not charged or is partially charged.

A sample current path for lower ghosting may be observed in FIG. 3, illustrated in dark colored arrows. In particular, the discharge of the parasitic capacitance Cprn, through the pixel/zone [n,1], to the parasitic capacitance Cpc1 may be observed.

In addition to the undesirability of the ghosting in terms of display quality, such ghosting is also undesirable because the current used in the charging and discharging of the parasitic capacitances is wasted energy in that it does not contribute to the display of images. Given that display panels are often used within battery powered devices, such a waste of energy is undesirable in its own right, as it discharges the battery more quickly.

As such, further development into the area of display panels in an attempt to eliminate or cancel such ghosting is desired.

SUMMARY

Also disclosed herein is a display, including a matrix of display elements arranged into rows and columns, with each row having a row driver associated therewith, and with each column having a column driver associated therewith. Each display element has an anode terminal and a cathode terminal. Each row has a cathode supply line coupled to the row driver for that row, and coupled to the cathode terminals for the display elements in that row. Each column has an anode supply line coupled to the column driver for that row, and coupled to the anode terminals for the display elements in that column. There is a switch for each cathode supply line selectively coupling that cathode supply line to the storage capacitor. There is a switch for each anode supply line selectively coupling that anode supply line to a storage capacitor. A display driver is configured to activate the column driver for a given column and activate the row driver for a given row resulting in current flowing from that column driver, through the anode supply line for that column, into the anode terminal of the display element associated with both the given row and the given column, and out from the cathode terminal of that display element, through the cathode supply line for that row to its row driver, thereby charging a parasitic capacitance associated with the given column. A switch driver is configured to close the switch for the cathode supply line for the given row to thereby transfer charge from the storage capacitor to a parasitic capacitance associated with the given row, and then open the switch for that cathode supply line. The display driver is further configured to deactivate the column driver for the given column, after closing of the switch for the cathode supply line for the given row. The switch driver is further configured to close the switch for the anode supply line for the given column to thereby transfer charge from a parasitic capacitance associated with the given column to the storage capacitor.

There may be a switch for selectively coupling the storage capacitor to a supply voltage, and the switch driver may be further configured to, prior to closing the switch for the cathode supply line for the given row, close the switch for selectively coupling the storage capacitor to the supply voltage to pre-charge the storage capacitor prior to charge transfer from the storage capacitor to the parasitic capacitance associated with the given row.

Each display element may be an emissive pixel comprising a plurality of sub-pixels, such that the display is an emissive display.

Each display element may be an emissive zone comprising a plurality of light emitting diodes arranged to emit light through a plurality of liquid crystals, such that the display is a non-emissive display.

Also disclosed herein is a method of operating a display panel having a matrix of display elements. The method includes steps of: a) causing flow of current from a source of power, into an anode of a given display element, out of a cathode of the given display element to ground, with the flow of current into the anode and out the cathode to ground resulting in charging of a parasitic capacitance associated with the anode; b) transferring charge from a storage capacitor to a parasitic capacitance associated with the cathode; and c) stopping the flow of current, and then transferring charge from the parasitic capacitance associated with the anode to the storage capacitor.

Steps a), b), and c) may be repeated for each display element within the matrix.

The method may also include, prior to transferring of charge from the storage capacitor to the parasitic capacitance associated with the cathode, at least partially charging the storage capacitor from a power source.

Also disclosed herein is a display including a matrix of display elements arranged into rows and columns, with each display element having an anode terminal and a cathode terminal, with each row having an anode supply line coupled to the anode terminals for the display elements in that row, and with each column having a cathode supply line coupled to the cathode terminals for the display elements in that column.

A switch for each anode supply line selectively couples that anode supply line to a storage capacitor, and a switch for each cathode supply line selectively couples that cathode supply line to the storage capacitor.

A display driver is configured to activate the row driver for a given row and activate the column driver for a given column, and a switch driver is configured to close the switch for the cathode supply line for the given column, and then open the switch for that cathode supply line.

The display driver is further configured to deactivate the row driver for the given row, after closing of the switch for the cathode supply line for the given column, and the switch driver is further configured to close the switch for the anode supply line for the given row.

A switch may selectively couple the storage capacitor to a supply voltage, and the switch driver may be further configured to, prior to closing the switch for the cathode supply line for the given column, close the switch for selectively coupling the storage capacitor to the supply voltage.

Each display element may include an emissive pixel comprising a plurality of sub-pixels, such that the display is an emissive display.

Each display element may include an emissive zone comprising a plurality of light emitting diodes arranged to emit light through a plurality of liquid crystals, such that the display is a non-emissive display.

Also disclosed herein is a display including a matrix of display elements arranged into rows and columns, with each display element having an anode terminal and a cathode terminal, with each row having a cathode supply line coupled to the cathode terminals for the display elements in that row, and with each column having an anode supply line coupled to the anode terminals for the display elements in that column.

A switch for each cathode supply line selectively couples that cathode supply line to a storage capacitor, a switch for each anode supply line selectively couples that anode supply line to the storage capacitor, a display driver is configured to activate the column driver for a given column and activate the row driver for a given row, and a switch driver is configured to close the switch for the cathode supply line for the given row, and then open the switch for that cathode supply line. The display driver may be further configured to deactivate the column driver for the given column, after closing of the switch for the cathode supply line for the given row, and the switch driver may be further configured to close the switch for the anode supply line for the given column.

A switch may selectively couple the storage capacitor to a supply voltage, and the switch driver may be further configured to, prior to closing the switch for the cathode supply line for the given row, close the switch for selectively coupling the storage capacitor to the supply voltage.

Each display element may include an emissive pixel comprising a plurality of sub-pixels, such that the display is an emissive display.

Each display element may include an emissive zone comprising a plurality of light emitting diodes arranged to emit light through a plurality of liquid crystals, such that the display is a non-emissive display.

Also disclosed herein is a method of operating a display panel having a matrix of display elements arranged into rows and columns. The method includes steps of: a) activating a row driver associated with a given row and a column driver associated with a given column; b) transferring charge from a storage capacitor to the cathode supply line for the given column to pre-charge a parasitic capacitance associated with the cathode supply line; c) deactivating the row driver associated with the given row; and d) transferring charge from the parasitic capacitance associated with the anode supply line to the storage capacitor.

The method may also include pre-charging the storage capacitor prior to step b).

Also disclosed herein is a method of operating a display panel having a matrix of display elements arranged into rows and columns. The method includes steps of: a) activating a column driver associated with a given column and a row driver associated with a given row; b) transferring charge from a storage capacitor to the cathode supply line for the given row to pre-charge a parasitic capacitance associated with the cathode supply line; c) deactivating the column driver associated with the given column; and d) transferring charge from the parasitic capacitance associated with the anode supply line to the storage capacitor;

The method may also include pre-charging the storage capacitor prior to step b).

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1A:
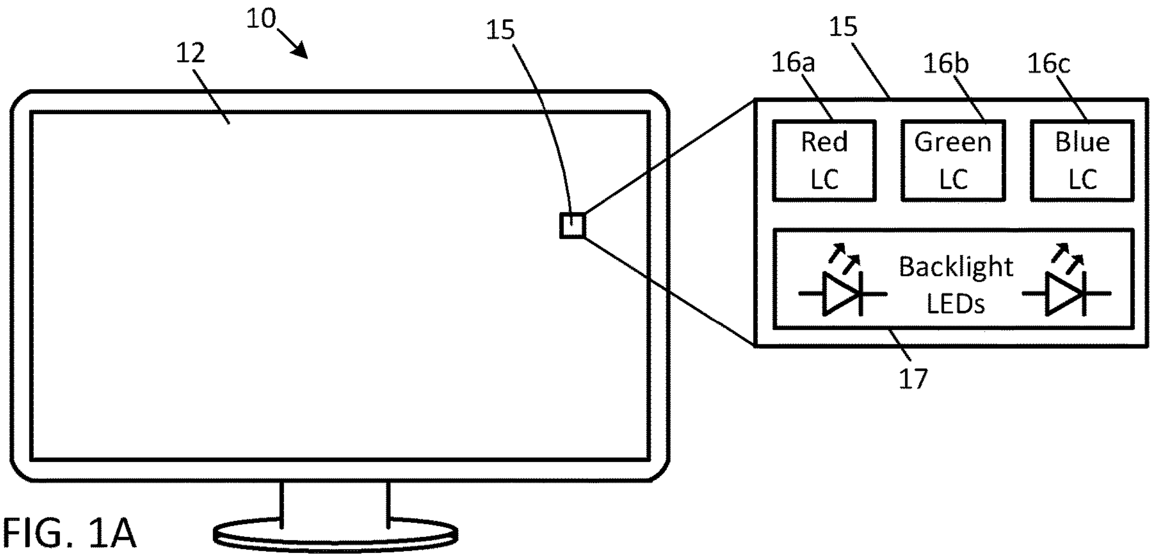
FIG. 1A (Prior Art)
FIG. 1A is a diagrammatical representation of a known non-emissive display.
Figure 1B:
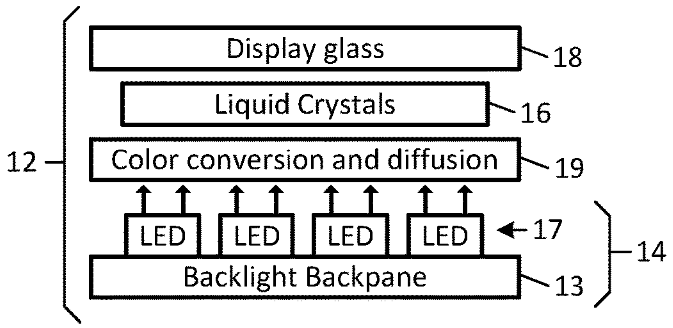
FIG. 1B (Prior Art)
FIG. 1B is a diagrammatical representation of cross section of the non-emissive display of FIG. 1A.
Figure 2A:
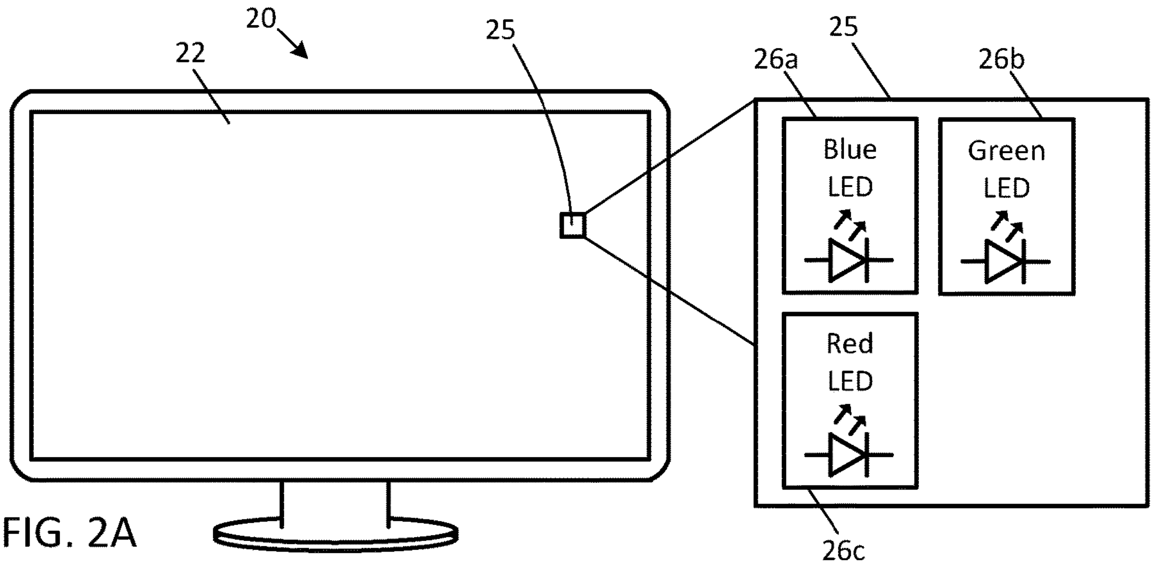
FIG. 2A (Prior Art)
FIG. 2A is a diagrammatical representation of a known non-emissive display.
Figure 2B:
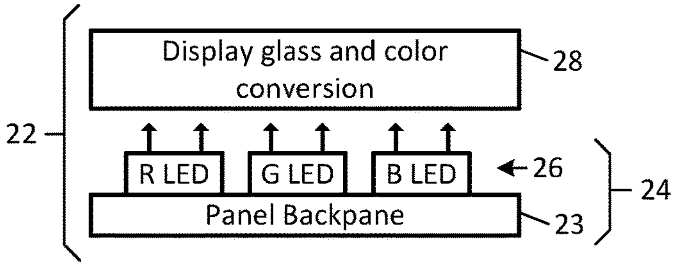
FIG. 2B (Prior Art)
FIG. 2B is a diagrammatical representation of cross section of the non-emissive display of FIG. 2A.
Figure 3:
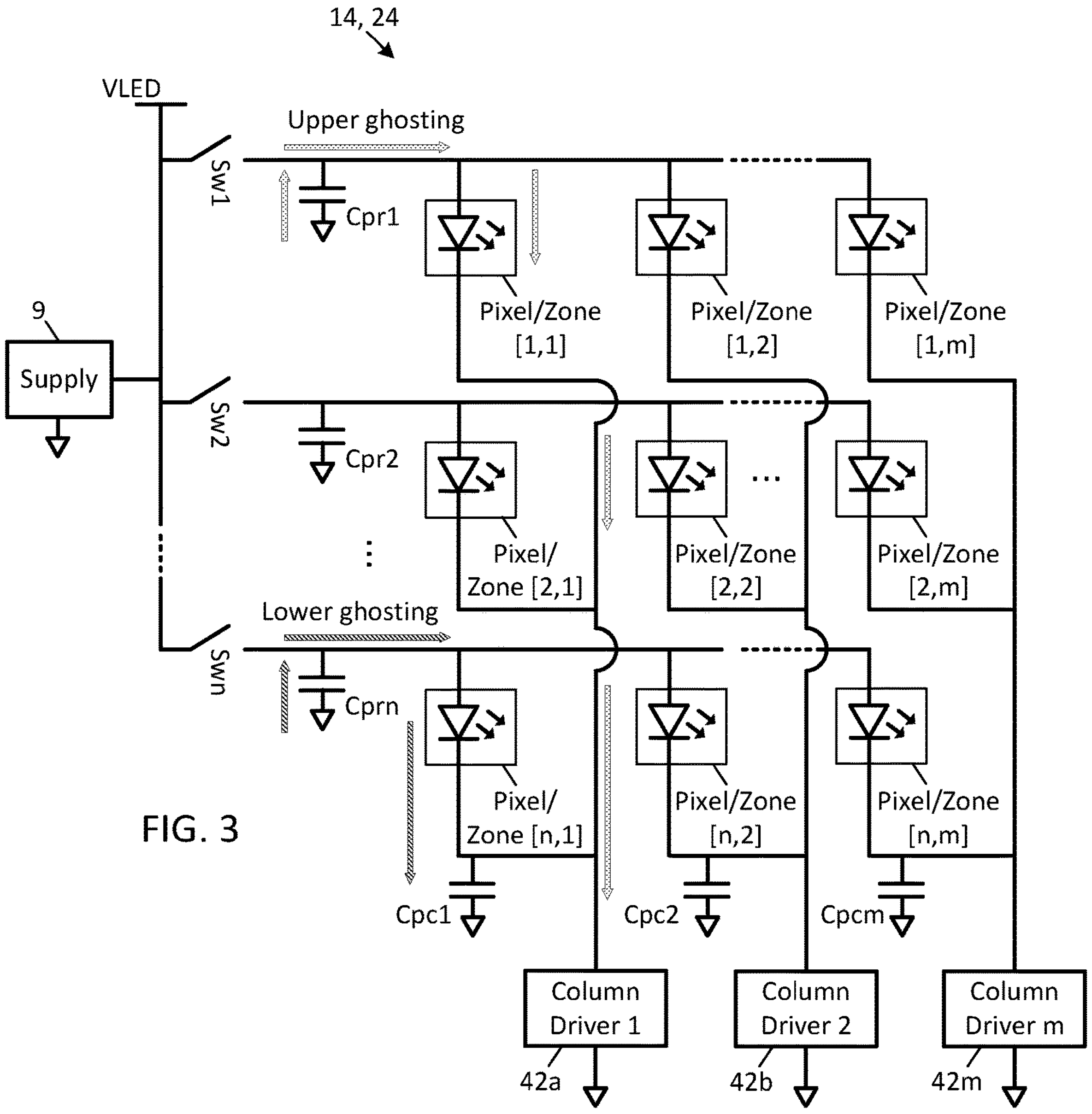
FIG. 3 is a block diagram of a display matrix of the display of either FIG. 1A or FIG. 1B.
Figure 4:
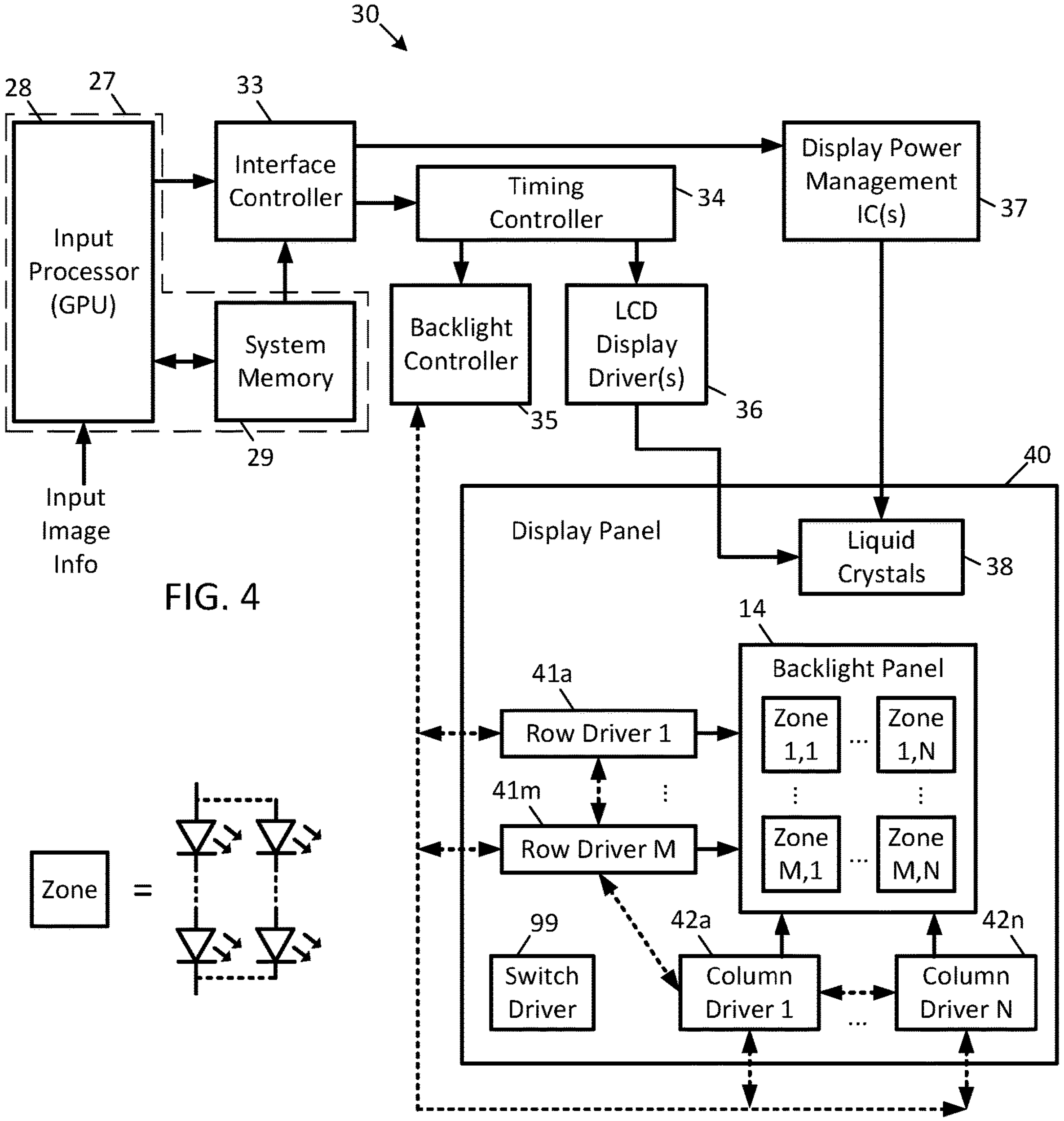
FIG. 4 is a block diagram of a display disclosed herein including a non-emissive display panel that eliminates ghosting.

A design for a display 30 utilizing a non-emissive display panel 40 is now described with reference to FIG. 4. The display 30 includes an interface controller 33 that receives input from an external device 27, such as a system-on-a-chip (SOC) or microcontroller including an input processor 28 (such as a GPU) and a system memory 29 in bidirectional communication with the input processor 28. The input processor 28 receives input image information and cooperates with the system memory 29 to generate an output to the interface controller 33 indicating the next frame of image data to be displayed on the liquid crystal layer 38 of the display panel 40. The interface controller 33 processes the output from the input processor 28, and provides outputs to a timing controller 34 and display power management circuitry 37. The timing controller 34 coordinates with the backlight controller 35 to provide control signals to the row drivers RD1, . . . , RDn and column drivers CD1, . . . , CDm associated with the backlight panel 14, and the LCD display drivers 36 to provide control signals to the liquid crystals 38, to enable coordination between the backlight panel 14 and the liquid crystals 38 so as to achieve image display. The display panel 40 includes a switch driver 99 for controlling switches within the display panel 40.

Each of the illustrated zones within the backlight panel 14 may include multiple serially connected LEDs, and those LED strings may be connected in parallel with one another.

Note that in some instances the row drivers RD1, . . . , RDn may be incorporated into one or more row drivers, and the column drivers CD1, . . . , CDm may be incorporated into one or more column drivers, and that these one or more row drivers and one or more column drivers may be integrated in or on the backlight panel 14.

The details of the interconnections and switches within the display circuitry 40 that accomplish the elimination or reduction of ghosting will be described below, but first, since such details are equally applicable to a display utilizing an emissive display panel, such a display utilizing an emissive display panel will be described.

Figure 5:
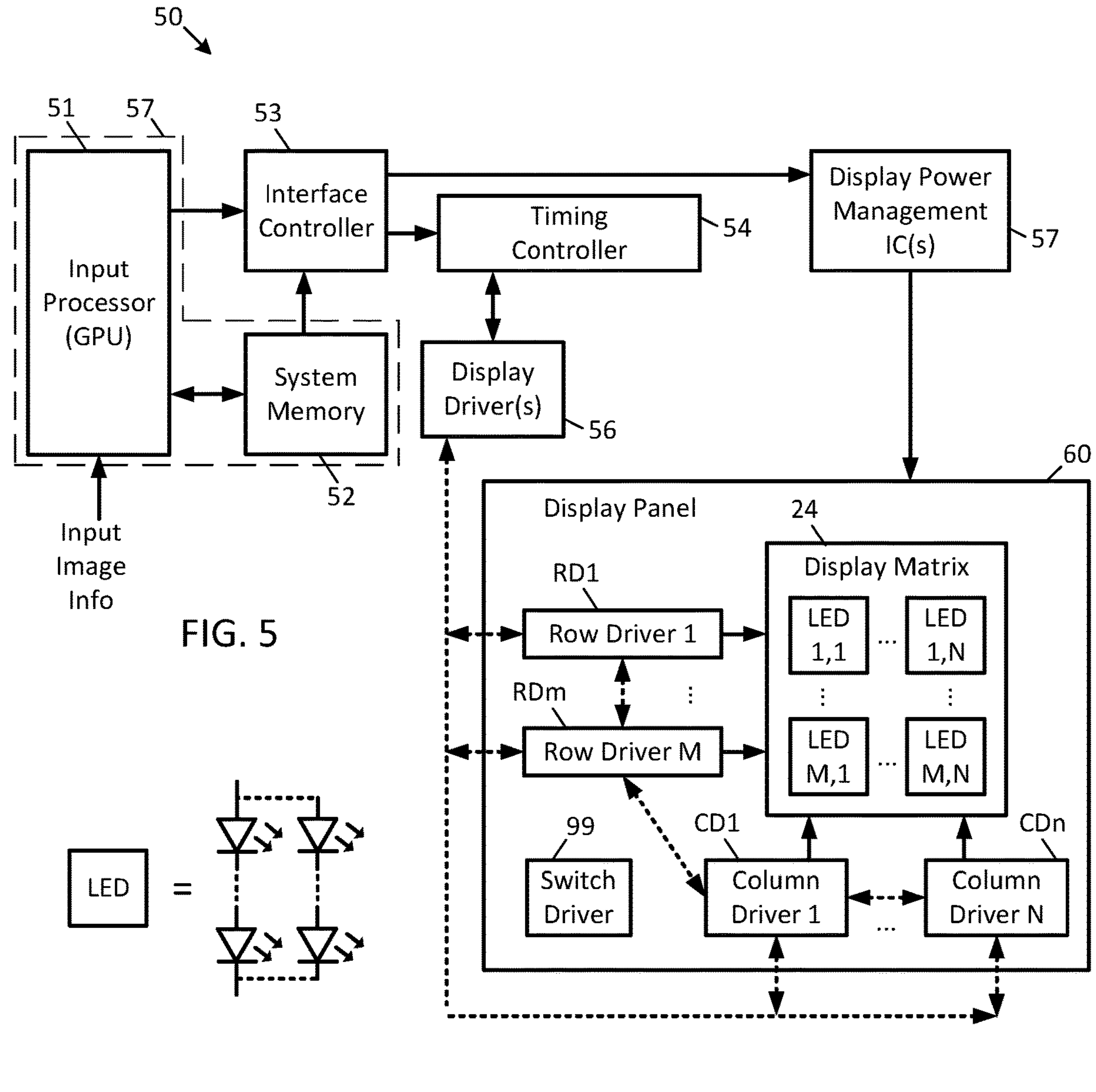
FIG. 5 is a block diagram of a display disclosed herein including an emissive display panel that eliminates ghosting.

A design for a display 50 utilizing an emissive display panel 60 is now described with reference to FIG. 5. The display 50 includes an interface controller 53 that receives input from an external device 57, such as a system-on-a-chip (SOC) or microcontroller including an input processor 51 (such as a GPU) and a system memory 52 in bidirectional communication with the input processor. The input processor 51 receives input image information, and cooperates with the system memory 52 to generate an output to the interface controller 53 indicating the next frame of image data to be displayed on the display matrix 24. The display matrix 24 is emissive, and may generate colored RGB light from the sub-pixels of each pixel, and additionally or alternatively may generate different light colors other than RGB from the sub-pixels of each pixels. The interface controller 53 processes the output from the input processor 51, and provides outputs to a timing controller 54 and display power management circuitry 57. The timing controller 54 coordinates with the display driver 56 to provide control signals to the row drivers RD1, RDn and column drivers CD1, CDm associated with the display panel 24 to provide control signals so as to achieve image display. The display panel 60 includes a switch driver 99 for controlling switches within the display panel 60.

Each of the illustrated pixels within the display matrix 24 includes sub-pixels of different colors (for example, red, green, blue, and/or other colors), and each such sub-pixel may include multiple serially connected LEDs of the appropriate color, and those multiple LED strings may be connected in parallel with one another.

Note that in some instances the row drivers RD1, RDn may be incorporated into one or more row drivers, and the column drivers CD1, CDm may be incorporated into one or more column drivers, and that these one or more row drivers and one or more column drivers may be integrated in or on the display matrix 24.

Figure 6:
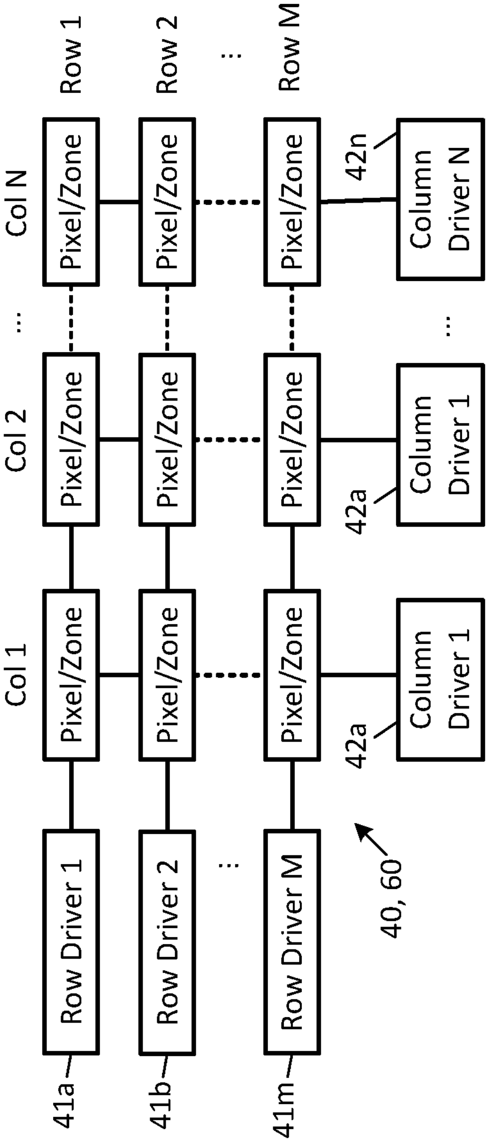
FIG. 6 is a diagrammatical representation of a display matrix of the display of either FIG. 4 or FIG. 5.

Now described with reference to FIG. 6 is a block diagram of the display panel 40 or 60 showing the interconnections between the different pixels/zones. Shown is an M×N matrix of pixels/zones, with a respective row driver RD1, . . . , RDn coupled to a respective anode-supply line for each row, and a respective column driver CD1, . . . , CDm coupled to a respective cathode-supply line for each column. It is to be recognized that M and N may be any integer numbers.

The electrical arrangement may be such each row driver RD1, . . . , RDn is coupled to the anodes of the LEDs within its own row, and such that each column driver CD1, . . . , CDm is coupled to the cathodes of the LEDs within its own column; conversely, the electrical arrangement may be such that each row driver is coupled to the cathode of the pixels within its own row, and such that each column driver is coupled to the anode of the pixels within its own column.

Figure 7:
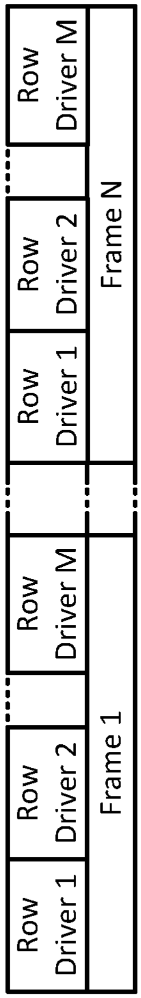
FIG. 7 is a diagrammatical representation of time division operation of the display matrix of FIG. 6.

Operation of the display panel 40 and 60 may be according to a time multiplexing scheme shown in FIG. 7, which is organized into image frames. During each image frame, each row driver RD1, . . . , RDn is successively activated, and during the activation of each row driver, all column drivers CD1, . . . , CDm are activated. Note that the order activation of the row drivers RD1, . . . , RDn during each image frame is configurable and may be changed on the fly during operation through operation of the backlight controller 35 (for non-emissive displays 40) or operation of the display drivers 56 (for emissive displays 60). Also, one or more rows may not be activated during a given image frame, or may be activated more than one time during a given image frame, and this is also configurable through operation of the backlight controller 35 or display drivers 56.

Figure 8:
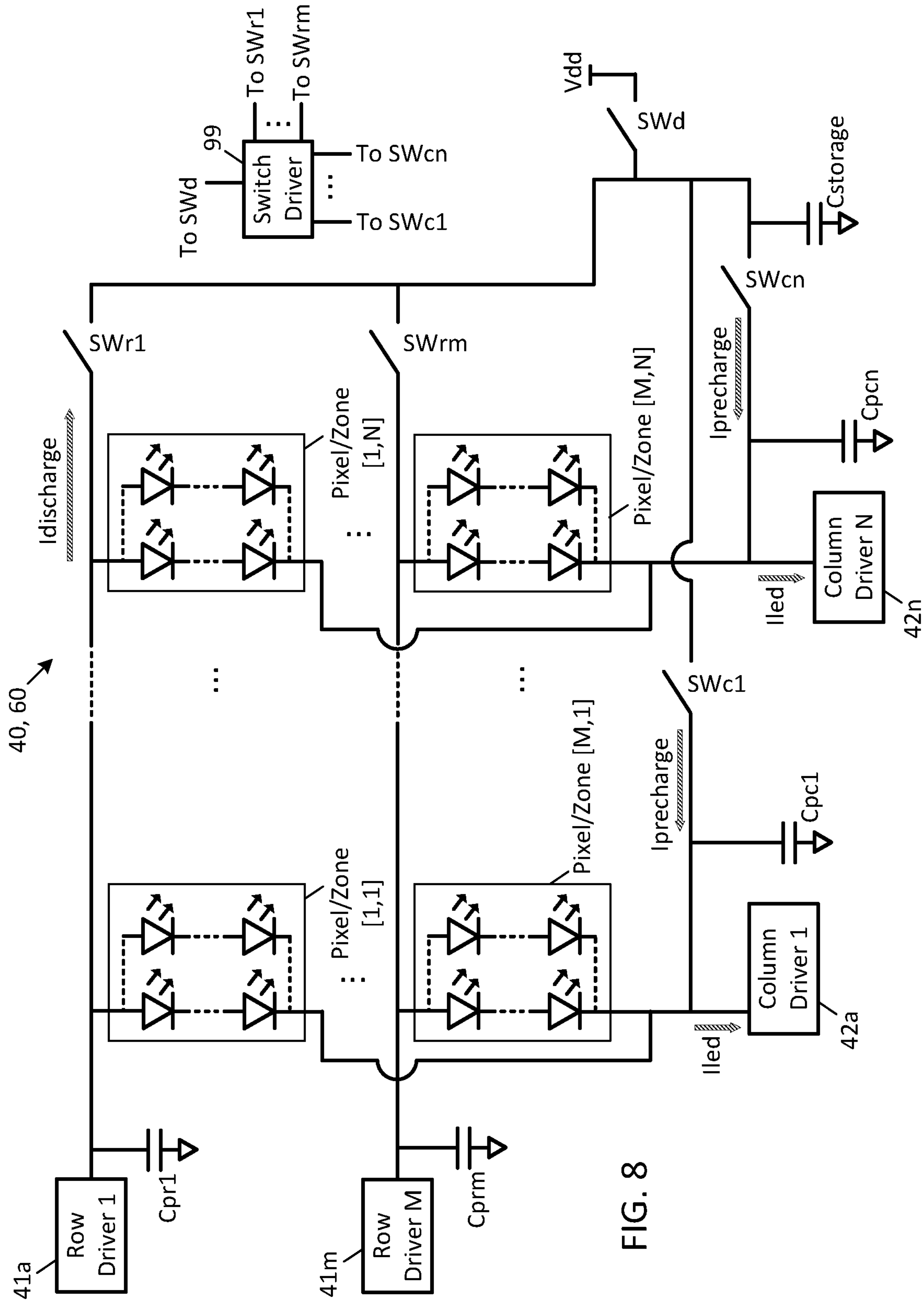
FIG. 8 is a schematic block diagram of the display matrix of the display of either FIG. 4 or FIG. 5, in a common cathode arrangement, in which the circuitry that eliminates ghosting is shown.

Now shown in FIG. 8 is a block diagram of the display panel 40 or 60 having an M×N matrix of pixels/zones, in which each row driver RD1, . . . , RDn is coupled to the anodes of the pixels/zones of its own row by a respective anode-supply line, and in which each column driver CD1, . . . , CDm is coupled to the cathodes of the pixels/zones of its own column by a respective cathode-supply line. Each row has a respective parasitic capacitance Cpr1, . . . , Cprn associated therewith, and each column has a respective parasitic capacitance Cpc1, . . . , Cpcm associated therewith. M and N may be any integer numbers, and thus the display panel 40 or 60 may have any number of rows or columns.

Each anode-supply line is selectively coupled to a storage capacitor Cstorage by a respective switch SWr, . . . , SWrm. The storage capacitor Cstorage is selectively coupled to the parasitic capacitance Cpc1 by a switch SWc1 and is selectively coupled to the parasitic capacitance Cpcm by a switch SWcn. An optional switch SWd selectively couples the storage capacitor to a supply voltage Vdd. The switches SWr, . . . , SWrm, the switches SWc1, . . . , SWcn, and SWd are controlled by a switch driver 99, which causes the switching of those switches described below. Note that the switch driver 99 may be integrated into one or more of the row drivers RD1, . . . , RDm, or may be integrated into one or more of the column drivers CD1, . . . , CDn, or may be integrated into any suitable external circuitry.

Figure 9:
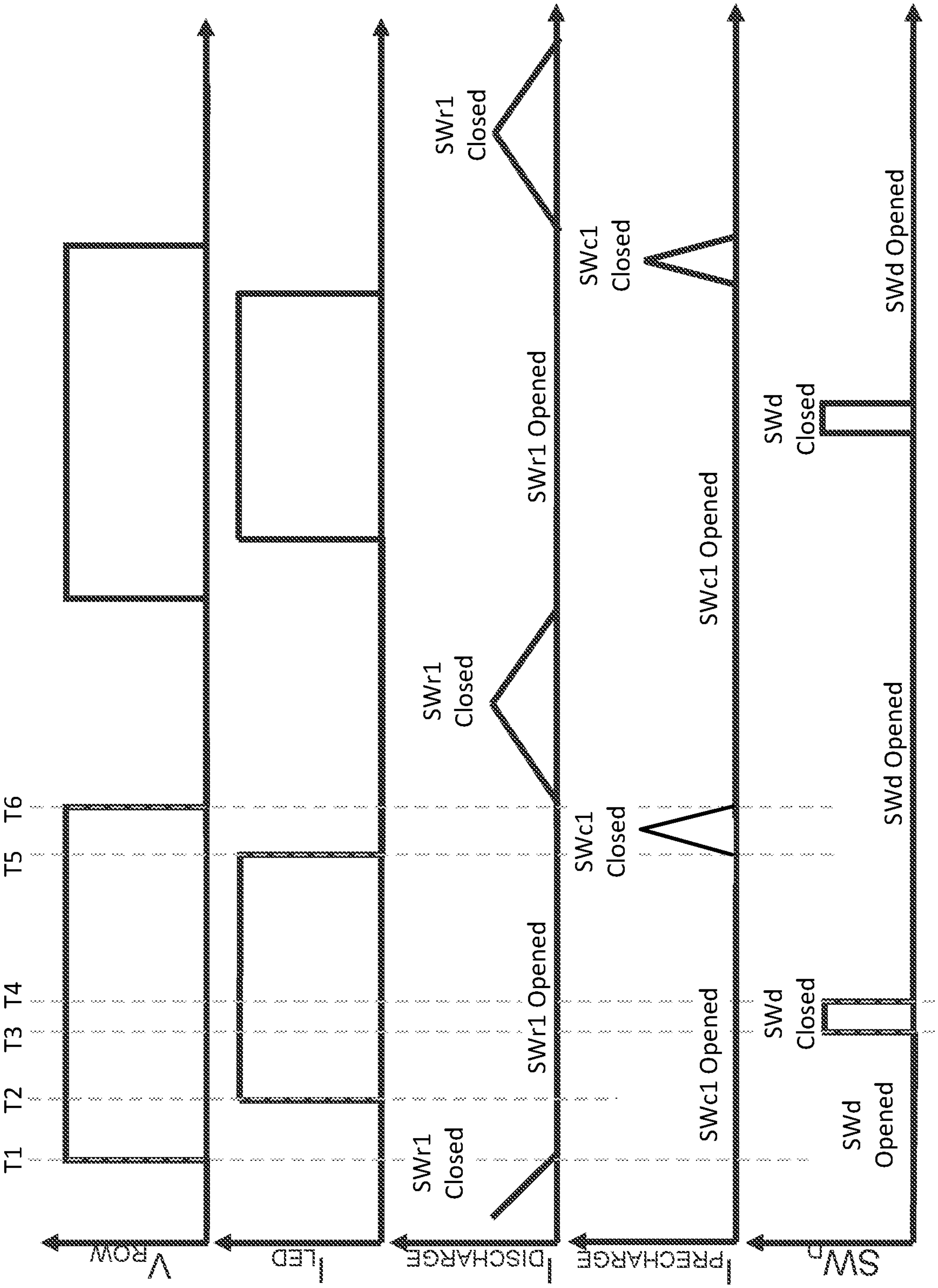
FIG. 9 is a timing diagram showing the display matrix of FIG. 8 in operation.

Operation is now described with additional reference to FIG. 9. Assume for this example that ghost cancelation is being performed for row 1 and column 1. Also, for purposes of this example, the switch SWr1 will be referred to as the discharge switch for the parasitic capacitance Cpr1 for row 1, and the switch SWc1 will be referred to as the pre-charge switch for the parasitic capacitance Cpc1 for column 1.

Prior to time T1, charge has been transferred from the row parasitic capacitance Cpr1 to the storage capacitor Cstorage.

At time T1, where switch SWr1 is opened, switch SWc1 is open, optional switch SWd is open, and the row driver RD1 and column driver CD1 are activated. The voltage on the anode-supply line for row 1 increases accordingly, and at time T2, current begins to flow through the pixel/zone [1,1] to the column driver CD1, causing emission of light. This current flow also has the effect of charging up the row parasitic capacitance Cpr1.

Ignore the operation of the optional switch SWd for the moment. At time T5, the column driver CD1 is deactivated, and the pre-charge switch SWc1 is closed, thereby pre-charging the column parasitic capacitance Cpc1 due to charge sharing between the storage capacitor Cstorage and the column parasitic capacitance Cpc1.

At time T6, the pre-charge switch SWc1 is opened, and the discharge switch SWr1 is closed, with the result being that the row parasitic capacitance Cpr1 is discharged to the storage capacitor Cstorage due to charge sharing.

In this way of transferring the charge from the parasitic row capacitance Cpr1 to the storage capacitor Cstorage upon the deactivation of the row driver RD1, "upper ghosting" is eliminated, since the discharge of the parasitic row capacitance Cpr1 is to the storage capacitor Cstorage instead of through the pixel/zone[1,1].

Moreover, in this way of pre-charging parasitic column capacitance Cpc1 prior to deactivation of the row driver RD1, "lower ghosting" is eliminated, since there is no path for charge to flow from the parasitic row capacitance Cpr1 through the pixel/zone[1,1] to the parasitic column capacitance Cpc1 (since Cpc1 will already be charged).

This technique not only eliminates upper ghosting, but saves power, because instead of the parasitic row capacitance Cpr1 discharging through the pixel/done, through the column driver, to ground, the charge from the parasitic row capacitance Cpr1 is transferred to the storage capacitor Cstorage, and then used to pre-charge the parasitic column capacitance Cpc1.

Returning now to the optional switch SWd, this switch may be closed between times T3 and T4 to thereby charge the storage capacitor Cstorage to a desired amount. This may be desirable depending on the capacitance value of the column parasitic capacitance Cpc1, so as to ensure that prior to time T5, Cstorage holds sufficient charge to fully pre-charge the column parasitic capacitance Cpc1.

The above operation has been described for one pixel/zone, and is repeated for each pixel/zone, with the difference being for those operations that the discharge switch SWr for the currently activated row is opened between times T1 and T6, that the pre-charge switch SWc for the currently activated column is closed between times T5 and T6, and that the discharge switch SWr for the currently activated row is closed between times T6 and the activation of the next row driver.

Figure 10:
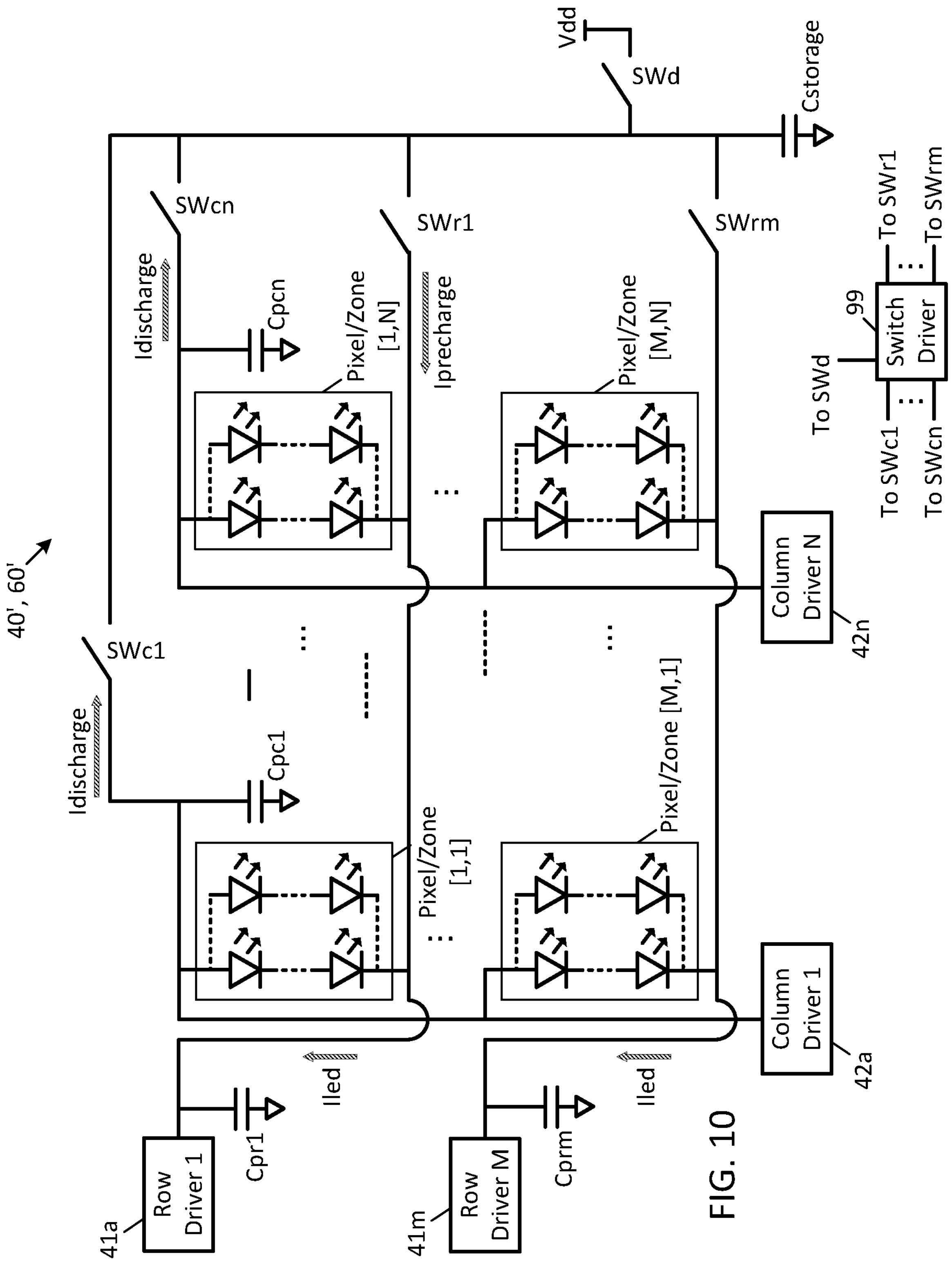
FIG. 10 is a schematic block diagram of the display matrix of the display of either FIG. 4 or FIG. 5, in a common anode arrangement, in which the circuitry that eliminates ghosting is shown.

Now shown in FIG. 10 is a block diagram of the display panel 40' or 60' having an M×N matrix of pixels/zones, in which each row driver RD1, . . . , RDn is coupled to the cathodes of the pixels/zones of its own row by a respective cathode-supply line, and in which each column driver CD1, . . . , CDm is coupled to the anodes of the pixels/zones of its own column by a respective anode-supply line. Each row has a respective parasitic capacitance Cpr1, . . . , Cprn associated therewith, and each column has a respective parasitic capacitance Cpc1, . . . , Cpcm associated therewith. M and N may be any integer numbers, and thus the display panel 40' or 60' may have any number of rows or columns.

Each anode-supply line is selectively coupled to a storage capacitor Cstorage by a respective switch SWc1, . . . , SWcn. The storage capacitor Cstorage is selectively coupled to the parasitic capacitance Cpr1 by a switch SWr1 and is selectively coupled to the parasitic capacitance Cprn by a switch SWrm. An optional switch SWd selectively couples the storage capacitor Cstorage to a supply voltage Vdd. The switches SWr, . . . , SWrm, the switches SWc1, . . . , SWcn, and SWd are controlled by a switch driver 99, which causes the switching of those switches described below.

Figure 11:
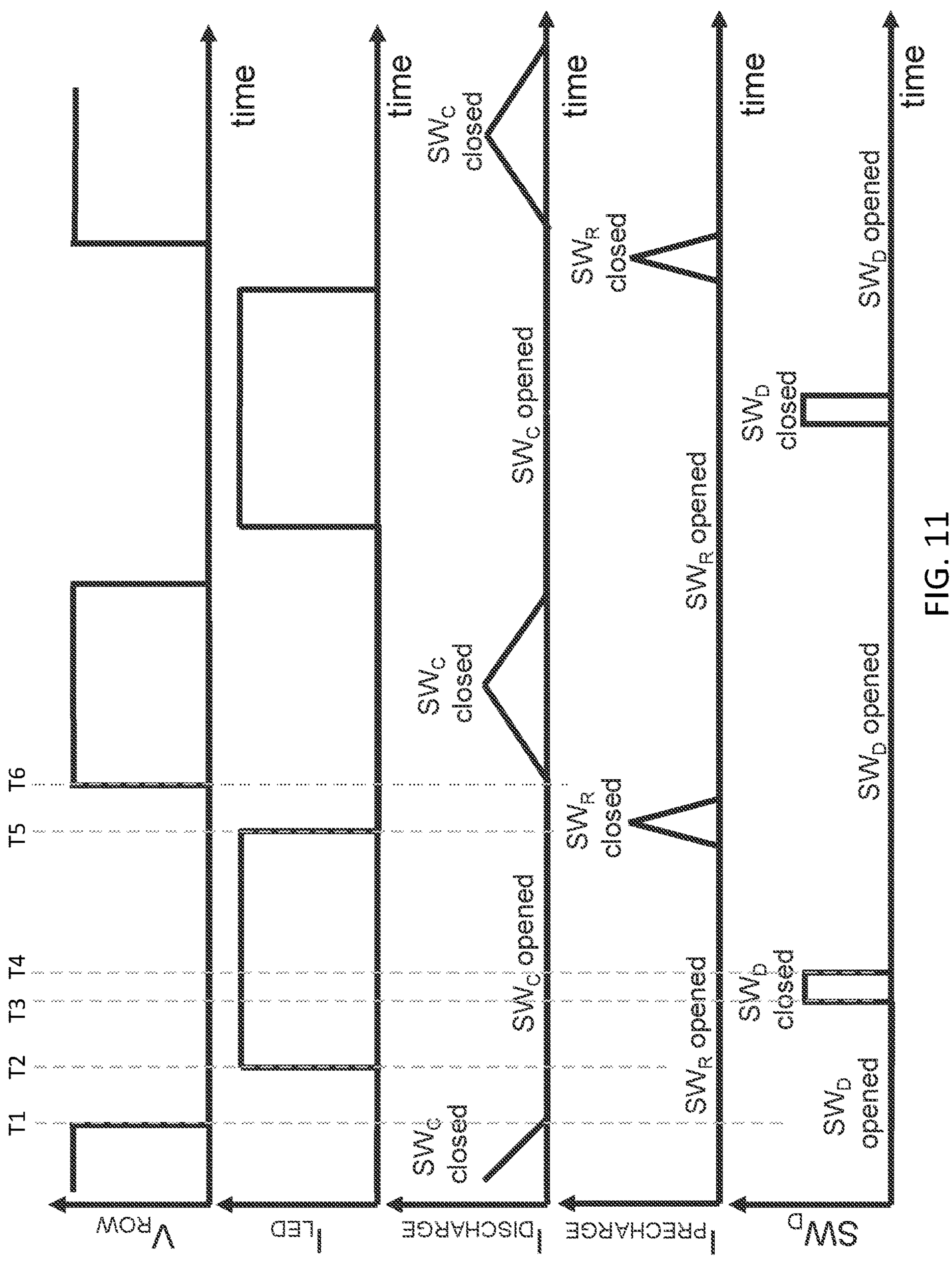
FIG. 11 is a timing diagram showing the display matrix of FIG. 10 in operation.

Operation is now described with additional reference to FIG. 11. Assume for this example that ghost cancelation is being performed for row 1 and column 1. Also, for purposes of this example, the switch SWc1 will be referred to as the discharge switch for the parasitic capacitance Cpc1 for column 1, and the switch SWr1 will be referred to as the pre-charge switch for the parasitic capacitance Cpr1 for row 1.

Prior to time T1, charge has been transferred from the column parasitic capacitance Cpc1 to the storage capacitor Cstorage.

At time T1, where switch SWc1 is opened, switch SWr1 is open, optional switch SWd is open, and the row driver RD1 and column driver CD1 are activated. The voltage on the cathode-supply line for column 1 decreases accordingly, and at time T2, current begins to flow through the pixel/zone [1,1] from the column driver CD1 to the row driver RD1, causing emission of light. This current flow also has the effect of charging up the column parasitic capacitance Cpc1.

Ignore the operation of the optional switch SWd for the moment. At time T5, the column driver CD1 is deactivated, and the pre-charge switch SWr1 is closed, thereby pre-charging the row parasitic capacitance Cpr1 due to charge sharing between the storage capacitor Cstorage and the row parasitic capacitance Cpr1.

At time T6, the pre-charge switch SWr1 is opened, and the discharge switch SWc1 is closed, with the result being that the column parasitic capacitance Cpc1 is discharged to the storage capacitor Cstorage due to charge sharing.

In this way of transferring the charge from the parasitic column capacitance Cpc1 to the storage capacitor Cstorage upon the deactivation of the column driver CD1, "upper ghosting" is eliminated, since the discharge of the parasitic column capacitance Cpc1 is to the storage capacitor Cstorage instead of through the pixel/zone [1,1].

Moreover, in this way of pre-charging parasitic row capacitance Cpr1 prior to the low to high commutation of the row driver RD1, "lower ghosting" is eliminated, since there is no path for charge to flow from the parasitic column capacitance Cpc1 through the pixel/zone[1,1] to the parasitic row capacitance Cpr1 (since Cpr1 will already be charged).

This technique not only eliminates lower ghosting, but saves power, because instead of the parasitic column capacitance Cpc1 discharging through the pixel/zone[1,1], through the row driver RD1 to ground, the charge from the parasitic column capacitance Cpc1 is transferred to the storage capacitor Cstorage, and then used to pre-charge the parasitic row capacitance Cpr1.

Returning now to the optional switch SWd, this switch may be closed between times T3 and T4 to thereby charge the storage capacitor Cstorage to a desired amount. This may be desirable depending on the capacitance value of the parasitic row capacitance Cpr1, so as to ensure that prior to time T5, Cstorage holds sufficient charge to fully pre-charge the parasitic row capacitance Cpr1.

The above operation has been described for one pixel/zone, and is repeated for each pixel/zone, with the difference being for those operations that the discharge switch SWc for the currently activated column is opened between times T1 and T6, that the pre-charge switch SWr for the currently activated row is closed between times T5 and T6, and that the discharge switch SWc for the currently activated column is closed between times T6 and the activation of the next column driver.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A display, comprising:
a matrix of display elements arranged into rows and columns, wherein each display element has an anode terminal and a cathode terminal;
wherein each row has an anode supply line coupled to the anode terminals for the display elements in that row;
wherein each column has a cathode supply line coupled to the cathode terminals for the display elements in that column;
a switch for each anode supply line selectively coupling that anode supply line to a storage capacitor;
a switch for each cathode supply line selectively coupling that cathode supply line to the storage capacitor;
a display driver configured to activate a row driver for a given row and activate a column driver for a given column; and
a switch driver configured to close the switch for the cathode supply line for the given column, and then open the switch for that cathode supply line;
wherein the display driver is further configured to deactivate the row driver for the given row, after closing of the switch for the cathode supply line for the given column; and
wherein the switch driver is further configured to close the switch for the anode supply line for the given row.

2. The display of claim 1, further comprising a switch for selectively coupling the storage capacitor to a supply voltage; and wherein the switch driver is further configured to, prior to closing the switch for the cathode supply line for the given column, close the switch for selectively coupling the storage capacitor to the supply voltage.

3. The display of claim 1, wherein each display element comprises an emissive pixel comprising a plurality of subpixels, such that the display is an emissive display.

4. The display of claim 1, wherein each display element comprises an emissive zone comprising a plurality of light emitting diodes arranged to emit light through a plurality of liquid crystals, such that the display is a non-emissive display.

5. A display, comprising:
a power source;
a matrix of display elements arranged into rows and columns;
wherein each display element has an anode terminal and a cathode terminal; and
switch circuitry configured to:
a) cause flow of current from the power source, into the anode terminal of a given one of the display elements of the matrix of display elements, and out of the cathode terminal of the given one of the display elements of the matrix of display elements to ground;
b) transfer charge from a storage capacitor to a parasitic capacitance associated with the cathode terminal; and
c) stop the flow of current, and then transfer charge from the parasitic capacitance associated with the anode terminal to the storage capacitor.

6. The display of claim 5, wherein the switch circuitry is further configured to repeat a), b), and c) for each display element within the matrix.

7. The display of claim 6, wherein the switch circuitry is further configured to, prior to performing b), cause flow of current from the power source into the storage capacitor.

8. A display, comprising:
a matrix of display elements arranged into rows and columns, wherein each display element has an anode terminal and a cathode terminal;
wherein each row has a cathode supply line coupled to the cathode terminals for the display elements in that row;
wherein each column has an anode supply line coupled to the anode terminals for the display elements in that column;
a switch for each cathode supply line selectively coupling that cathode supply line to a storage capacitor;
a switch for each anode supply line selectively coupling that anode supply line to the storage capacitor;
a display driver configured to activate a column driver for a given column and activate a row driver for a given row; and
a switch driver configured to close the switch for the cathode supply line for the given row, and then open the switch for that cathode supply line;
wherein the display driver is further configured to deactivate the column driver for the given column, after closing of the switch for the cathode supply line for the given row; and
wherein the switch driver is further configured to close the switch for the anode supply line for the given column.

9. The display of claim 8, further comprising a switch for selectively coupling the storage capacitor to a supply voltage; and wherein the switch driver is further configured to, prior to closing the switch for the cathode supply line for the given row, close the switch for selectively coupling the storage capacitor to the supply voltage.

10. The display of claim 8, wherein each display element comprises an emissive pixel comprising a plurality of subpixels, such that the display is an emissive display.

11. The display of claim 8, wherein each display element comprises an emissive zone comprising a plurality of light emitting diodes arranged to emit light through a plurality of liquid crystals, such that the display is a non-emissive display.

12. A method of operating a display panel having a matrix of display elements arranged into rows and columns, the method comprising steps of:

a) activating a row driver associated with a given row and a column driver associated with a given column;

b) transferring charge from a storage capacitor to a cathode supply line for the given column to pre-charge a parasitic capacitance associated with the cathode supply line;

c) deactivating the row driver associated with the given row; and d) transferring charge from the parasitic capacitance associated with an anode supply line associated with the given row to the storage capacitor.

13. The method of claim 12, further comprising pre-charging the storage capacitor prior to step b).

14. A method of operating a display panel having a matrix of display elements arranged into rows and columns, the method comprising steps of:

a) activating a column driver associated with a given column and a row driver associated with a given row;

b) transferring charge from a storage capacitor to a cathode supply line for the given row to pre-charge a parasitic capacitance associated with the cathode supply line;

c) deactivating the column driver associated with the given column; and d) transferring charge from the parasitic capacitance associated with an anode supply line associated with the given row to the storage capacitor.

15. The method of claim 14, further comprising pre-charging the storage capacitor prior to step b).

* * * * *